US011727716B2

(12) United States Patent
Omori et al.

(10) Patent No.: US 11,727,716 B2
(45) Date of Patent: Aug. 15, 2023

(54) INFORMATION PROCESSING APPARATUS, IMAGING APPARATUS, WHICH DETERMINES EXPOSURE AMOUNT WITH RESPECT TO FACE DETECTION AND HUMAN BODY DETECTION

(71) Applicant: CANON KABUSHIKI KAISHA, Tokyo (JP)

(72) Inventors: Hirotaka Omori, Tokyo (JP); Toshiyuki Dobashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 17/184,348

(22) Filed: Feb. 24, 2021

(65) Prior Publication Data

US 2021/0271868 A1    Sep. 2, 2021

(30) Foreign Application Priority Data

Feb. 28, 2020    (JP) .............................. JP2020-033883

(51) Int. Cl.
*G06V 40/16* (2022.01)
*G06V 40/10* (2022.01)
*H04N 23/71* (2023.01)
*G06V 10/60* (2022.01)
(Continued)

(52) U.S. Cl.
CPC ............ *G06V 40/164* (2022.01); *G06V 10/50* (2022.01); *G06V 10/60* (2022.01); *G06V 10/993* (2022.01); *G06V 40/10* (2022.01); *G06V 40/161* (2022.01); *G06V 40/171* (2022.01); *H04N 23/71* (2023.01)

(58) Field of Classification Search
CPC ............. H04N 5/2351; H04N 5/23219; H04N 5/2353; H04N 5/2355; H04N 5/23245; H04N 5/243; H04N 5/23229; H04N 23/71; H04N 23/611; H04N 23/72; G06V 10/60; G06V 10/87; G06V 20/52; G06V 40/16; G06V 40/10; G06V 40/161; G06V 40/164;
(Continued)

(56) References Cited

U.S. PATENT DOCUMENTS 10,175,451 B2 *    1/2019  Omata ................... G03B 13/36
2014/0185875 A1 *  7/2014  Tsuji .................... G06V 40/161
                                                            382/103
(Continued)

FOREIGN PATENT DOCUMENTS

JP    2005086682 A         3/2005
JP    2015130615 A    *    7/2015

*Primary Examiner* — Luong T Nguyen
(74) *Attorney, Agent, or Firm* — Canon U.S.A, Inc. IP Division

(57) ABSTRACT

An information processing apparatus includes an image acquisition unit configured to acquire an image, a first detection unit configured to detect a specific object from the image, a second detection unit configured to detect a part of the specific object from the image, an exposure determination unit configured to determine a first exposure amount with respect to the specific object detected by the first detection unit, and to determine a second exposure amount with respect to the part of the specific object detected by the second detection unit, and a parameter determination unit configured to determine a parameter regarding at least one of the first detection unit, the second detection unit, and the exposure determination unit.

16 Claims, 10 Drawing Sheets

(51) Int. Cl.
*G06V 10/50* (2022.01)
*G06V 10/98* (2022.01)

(58) Field of Classification Search
CPC .... G06V 10/50; G06V 10/993; G06V 40/171; G06K 9/6227
See application file for complete search history.

(56) References Cited

U.S. PATENT DOCUMENTS

| | | | | |
|---|---|---|---|---|
| 2016/0173759 | A1* | 6/2016 | Nakamura | H04N 5/232127 348/222.1 |
| 2017/0024606 | A1* | 1/2017 | Okada | G06V 40/161 |

* cited by examiner

EXAMPLE OF DETECTION OF FACE REGION

EXAMPLE OF DETECTION OF HUMAN BODY REGION

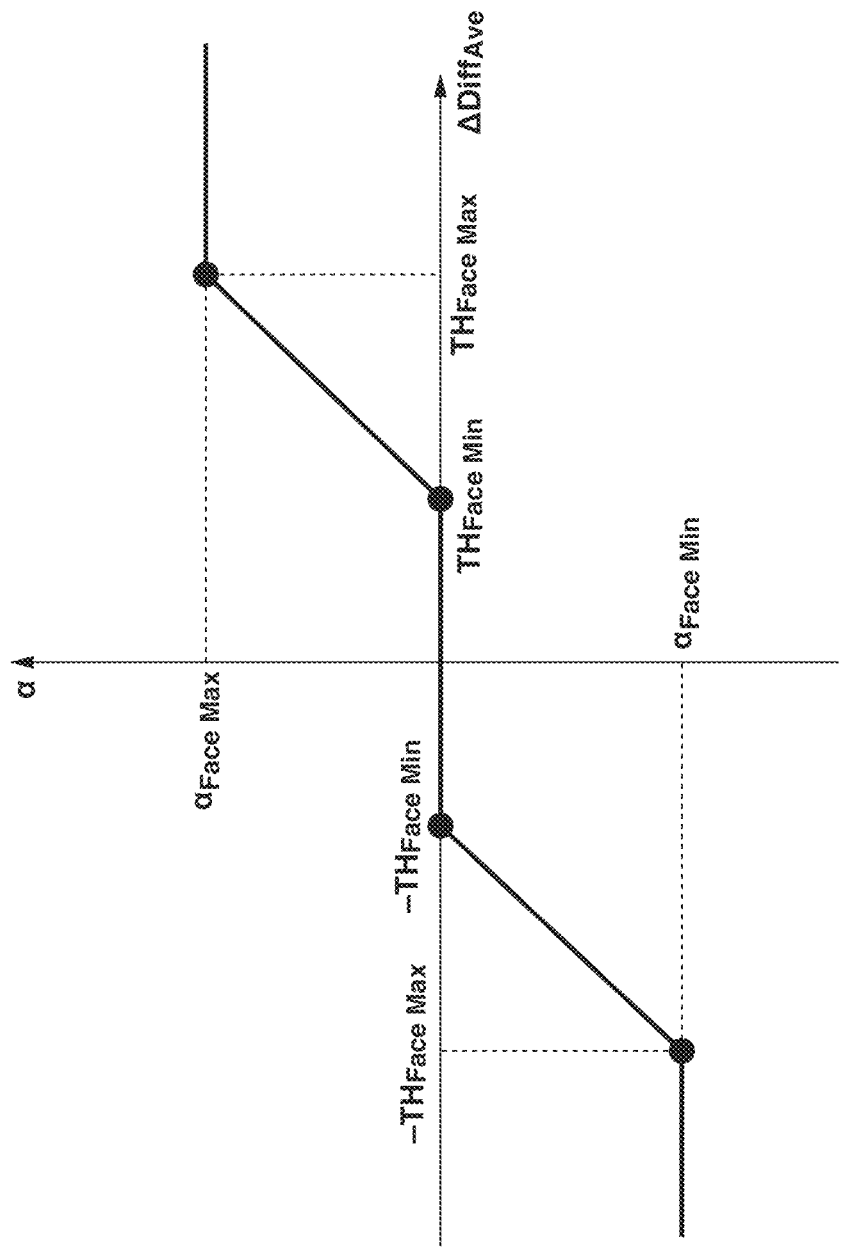

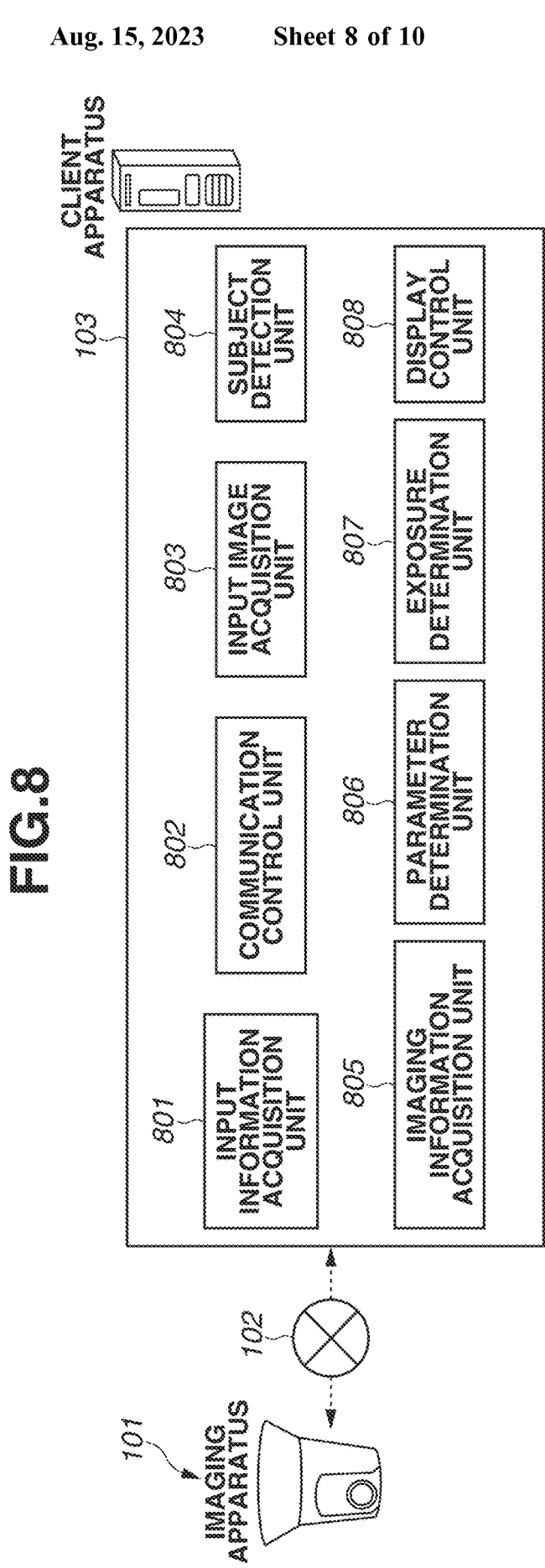

FIG.10A
EXAMPLE WHEN SHUTTER SPEED IS HIGH

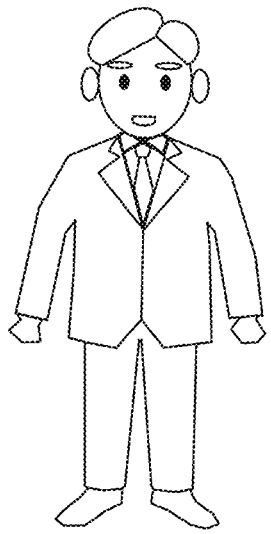

FACE DETECTION UNIT (DEFAULT)
 MAXIMUM DETECTED SIZE           50 (0 – 100)
 MINIMUM DETECTED SIZE           4 (0 – 100)
 MAXIMUM NUMBER OF DETECTED TARGETS   50 (0 – 100)

HUMAN BODY DETECTION UNIT (DEFAULT)
 MAXIMUM DETECTED SIZE           50 (0 – 100)
 MINIMUM DETECTED SIZE           4 (0 – 100)
 MAXIMUM NUMBER OF DETECTED TARGETS   50 (0 – 100)

FIG.10B
EXAMPLE WHEN SHUTTER SPEED IS LOW

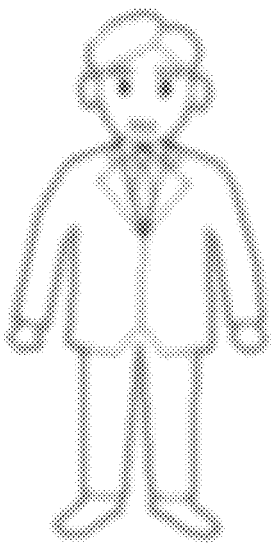

FACE DETECTION UNIT
 MAXIMUM DETECTED SIZE           10 (0 – 100)
 MINIMUM DETECTED SIZE           8 (0 – 100)
 MAXIMUM NUMBER OF DETECTED TARGETS   5 (0 – 100)

HUMAN BODY DETECTION UNIT
 MAXIMUM DETECTED SIZE           80 (0 – 100)
 MINIMUM DETECTED SIZE           2 (0 – 100)
 MAXIMUM NUMBER OF DETECTED TARGETS   80 (0 – 100)

INFORMATION PROCESSING APPARATUS, IMAGING APPARATUS, WHICH DETERMINES EXPOSURE AMOUNT WITH RESPECT TO FACE DETECTION AND HUMAN BODY DETECTION

BACKGROUND

Field

The present disclosure relates to an information processing apparatus, an imaging apparatus, a method, and a storage medium.

Description of the Related Art

Conventionally, there has been known a technique for detecting a face region of a subject from a captured image and adjusting a pixel value of the captured image based on information regarding the above-described face region in Japanese Patent Application Laid-Open No. 2005-86682.

SUMMARY

An information processing apparatus includes an image acquisition unit configured to acquire an image, a first detection unit configured to detect a specific object from the image, a second detection unit configured to detect a part of the specific object from the image, an exposure determination unit configured to determine a first exposure amount with respect to the specific object detected by the first detection unit, and to determine a second exposure amount with respect to the part of the specific object detected by the second detection unit, and a parameter determination unit configured to determine a parameter regarding at least one of the first detection unit, the second detection unit, and the exposure determination unit.

Further features of the present disclosure will become apparent from the following description of exemplary embodiments with reference to the attached drawings.

BRIEF DESCRIPTION OF THE DRAWINGS

FIG. 7 illustrates a relationship among parameters regarding an exposure.

FIG. 8 is a block diagram illustrating a functional configuration of the client apparatus proposed in a second exemplary embodiment.

FIGS. 10A and 10B illustrate detection parameters of detection units proposed in the second exemplary embodiment.

DESCRIPTION OF THE EMBODIMENTS

Figure 1:
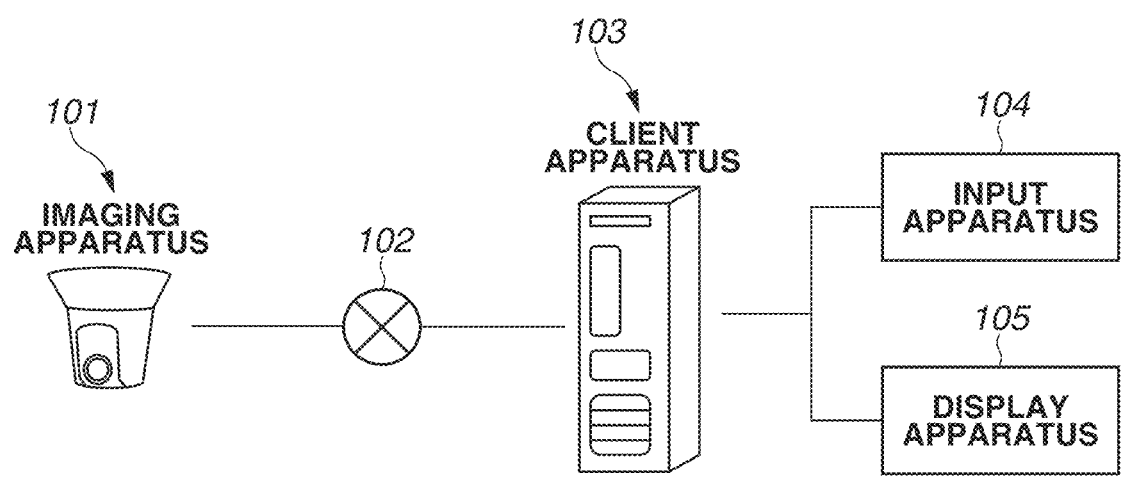
FIG. 1 is a block diagram illustrating a configuration of an imaging control system according to an exemplary embodiment of the present disclosure.

FIG. 1 is a block diagram illustrating a configuration of an imaging control system according to a first exemplary embodiment. The imaging system illustrated in FIG. 1 includes an imaging apparatus (monitoring camera) 101 as an apparatus that captures a moving image and processes the image, a client apparatus 103 connected via a network (Internet Protocol (IP) network) 102 in a mutually communicable state, an input apparatus 104, and a display apparatus 105.

Figure 2:
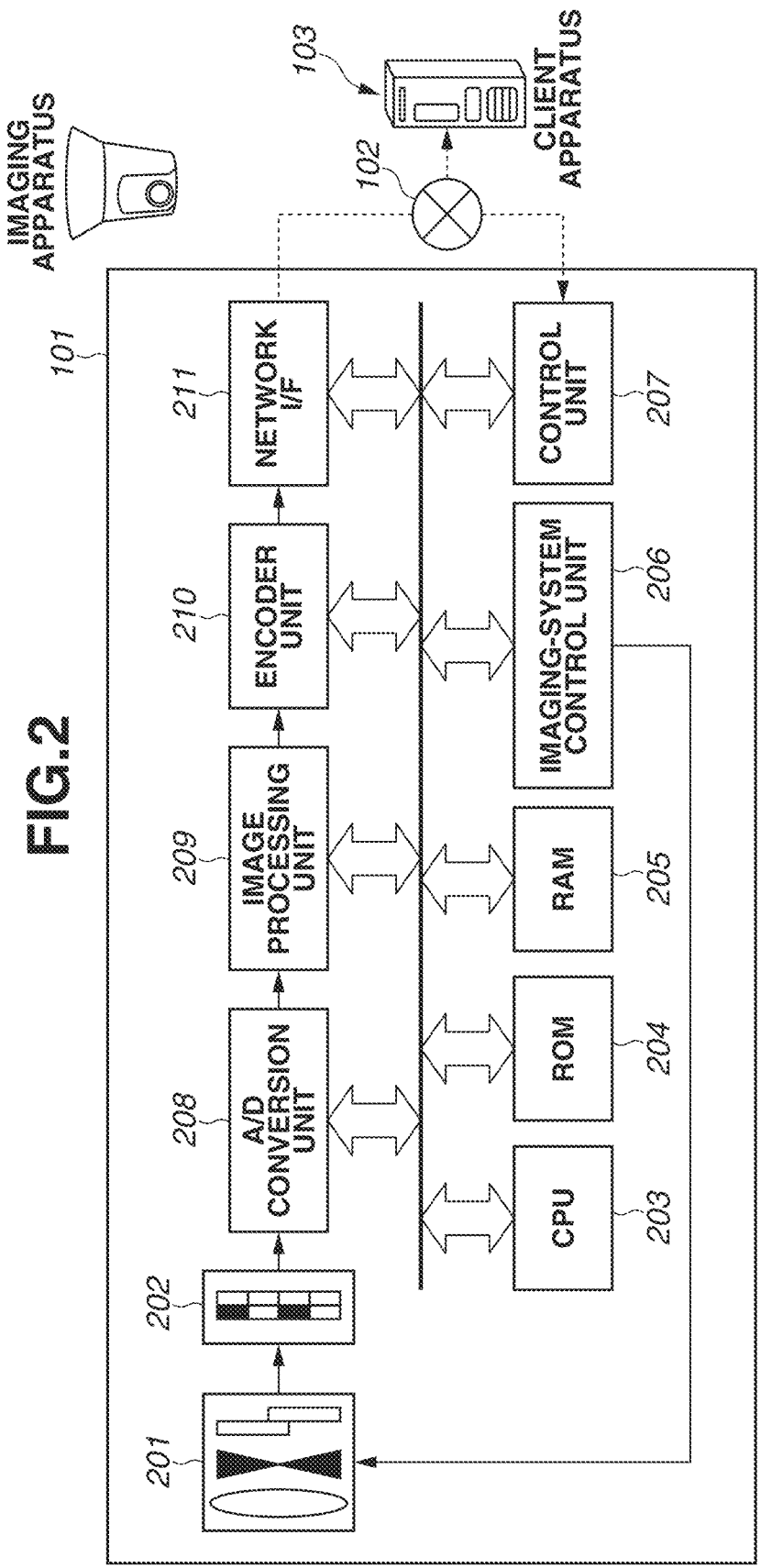
FIG. 2 is a block diagram illustrating a hardware configuration of an imaging processing apparatus according to the present exemplary embodiment.

FIG. 2 is a block diagram illustrating an internal configuration of the imaging apparatus 101 according to the present exemplary embodiment. An imaging optical system 201 includes a zoom lens, a focus lens, a blur correction lens, an aperture, and a shutter, and collects light information of a subject. An image sensor unit 202 is an element that converts the light information collected by the imaging optical system 201 into an electric current value, and acquires color information by being combined with a color filter or the like. Further, assuming that the image sensor unit 202 is an image sensor allowing an arbitrary exposure time to be set to all pixels. A central processing unit (CPU) 203 is involved with entire processing of each configuration, and sequentially reads in commands stored in a read only memory (ROM) 204 or a random access memory (RAM) 205, interprets them, and performs processing according to a result thereof. An imaging-system control unit 206 performs control instructed by the CPU 203 on the imaging optical system 201, such as focusing the imaging optical system 201, opening the shutter, and adjusting the aperture. A control unit 207 performs control based on an instruction from the client apparatus 103. An analog/digital (A/D) conversion unit 208 converts a light amount of the subject detected by the imaging optical system 201 into a digital signal value. An image processing unit 209 performs image processing on image data represented by the above-described digital signal. An encoder unit 210 performs processing for converting the image data processed by the image processing unit 209 into a file format such as Motion Joint Photographic Experts Group (JPEG), H.264, and H.265. A network interface (I/F) 211 is an interface used in communication with an external apparatus such as the client apparatus 103 via the network 102.

The network 102 is a network that connects the imaging apparatus 101 and the client apparatus 103. The network 102 includes a plurality of routers, a switch, a cable, and the like that satisfy a communication standard such as Ethernet®. In the present exemplary embodiment, the network 102 can be any network capable of establishing communication between the imaging apparatus 101 and the client apparatus 103, and the communication standard, the scale, and the configuration thereof are not especially limited. For example, the network 102 can be constructed using the Internet, a wired local area network (LAN), a wireless LAN, a wide area network (WAN), or the like.

Figure 3:
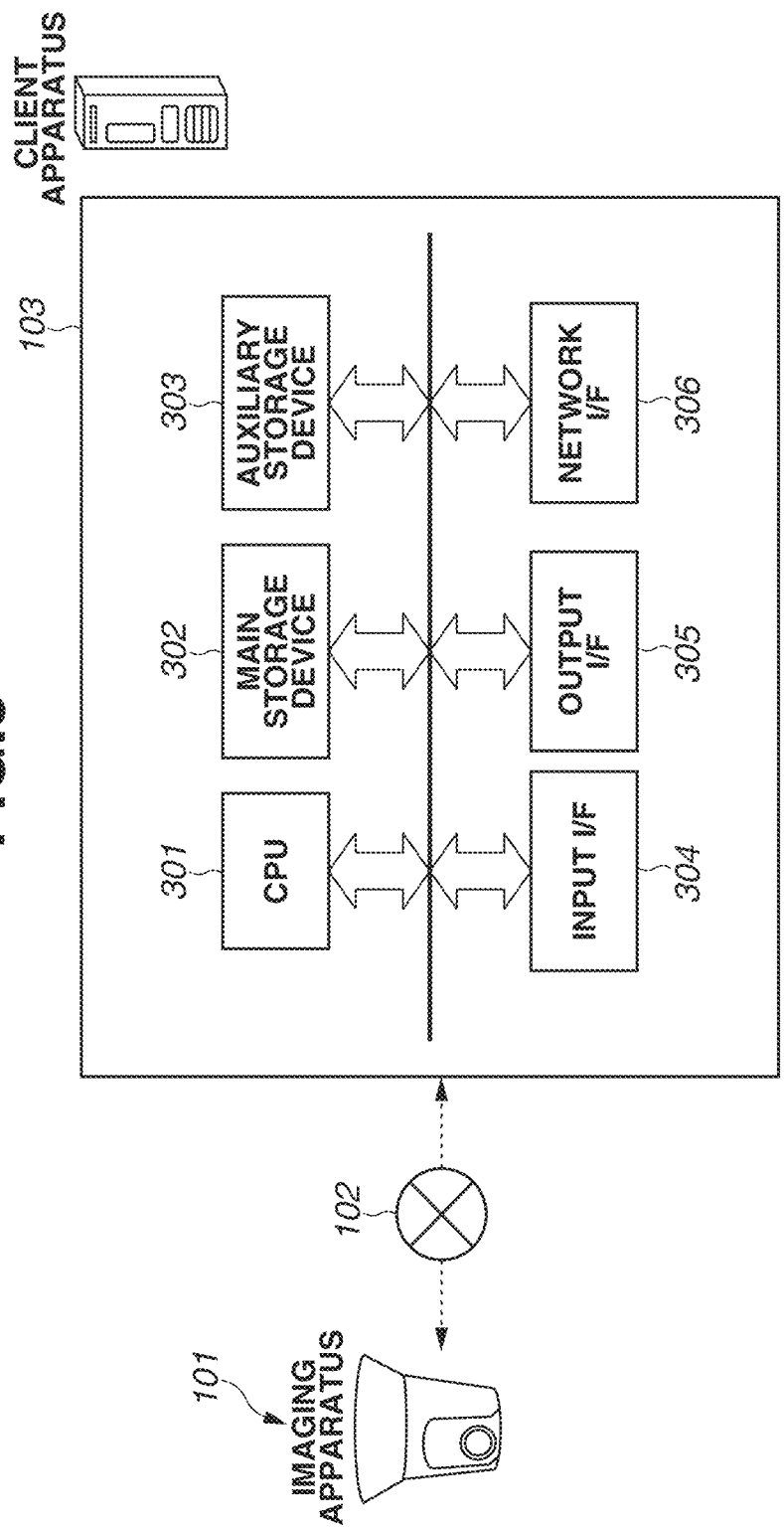
FIG. 3 is a block diagram illustrating a hardware configuration of a client apparatus according to the present exemplary embodiment.

FIG. 3 is a block diagram illustrating an example of an internal configuration of the client apparatus 103 according to the present exemplary embodiment. The client apparatus 103 includes a CPU 301, a main storage device 302, an auxiliary storage device 303, an input I/F 304, an output I/F 305, and a network I/F 306. Each of the components is mutually communicably connected via a system bus.

The CPU 301 is a central processing unit that controls an operation of the client apparatus 103. The main storage device 302 is a storage device that functions as a location temporarily storing data of the CPU 301, such as a RAM. The auxiliary storage device 303 is a storage device that stores various kinds of programs, various kinds of setting data, and the like, such as a hard disk drive (HDD), a ROM, and a solid state drive (SSD). The input I/F 304 is an interface used when an input is received from the input apparatus 104 or the like. The output I/F 305 is an interface used when information is output to the display apparatus 105 or the like. The network I/F 306 is an interface used in communication with an external apparatus such as the imaging apparatus 101 via the network 102.

Figure 4:
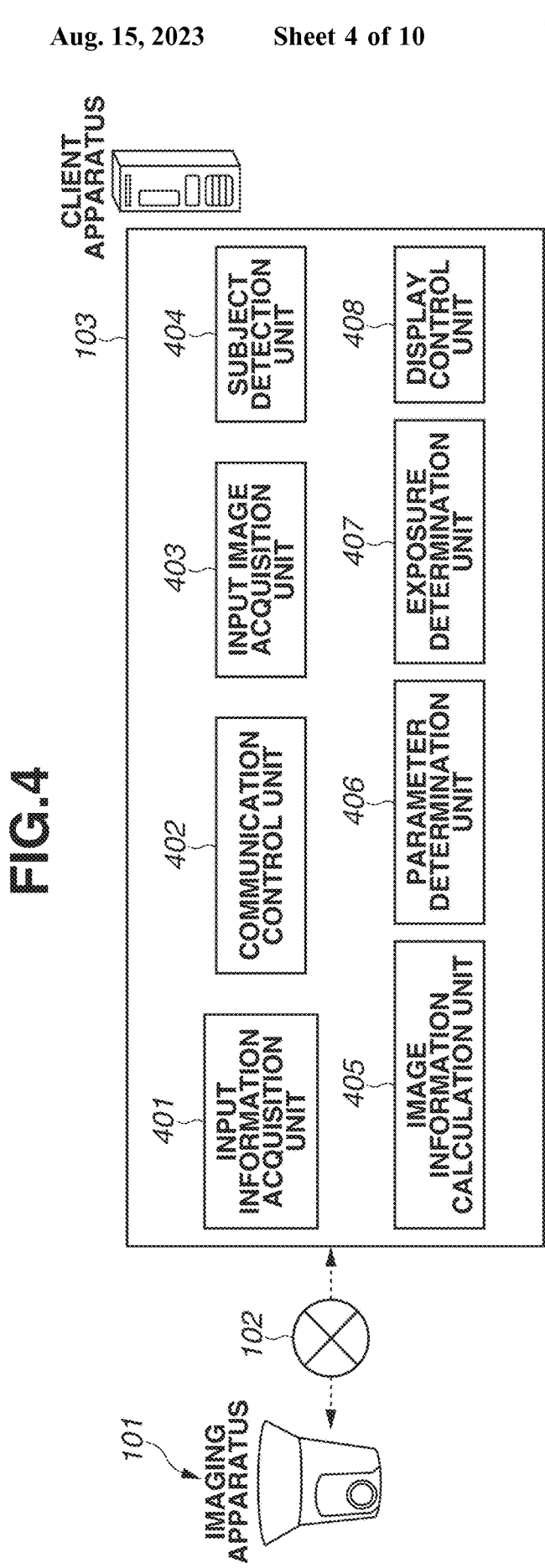
FIG. 4 is a block diagram illustrating a functional configuration of the client apparatus proposed in a first exemplary embodiment.

The CPU 301 performs processing based on the program stored in the auxiliary storage device 303, thereby realizing functions and processing of the client apparatus 103 illustrated in FIG. 4.

The input apparatus 104 is an input apparatus embodied by a mouse, a keyboard, and the like. The display apparatus 105 is to display an image output to the client apparatus 103, such as a monitor. In the present exemplary embodiment, assume that the client apparatus 103, the input apparatus 104, and the display apparatus 105 are individually independent apparatuses. However, for example, the client apparatus 103 and the display apparatus 105 can be integrated, or the input apparatus 104 and the display apparatus 105 can be integrated. Alternatively, the client apparatus 103, the input apparatus 104, and the display apparatus 105 can be integrated.

FIG. 4 illustrates an example of a functional configuration of the client apparatus 103. The client apparatus 103 includes an input information acquisition unit 401, a communication control unit 402, an input image acquisition unit 403, a subject detection unit 404, an image information calculation unit 405, a parameter determination unit 406, an exposure determination unit 407, and a display control unit 408.

The input information acquisition unit 401 receives an input by a user via the input apparatus 104. The communication control unit 402 receives an image transmitted from the imaging apparatus 101 via the network 102. Further, the communication control unit 402 transmits a control instruction directed to the imaging apparatus 101 via the network 102. The input image acquisition unit 403 acquires the image captured by the imaging apparatus 101 via the communication control unit 402 as an image targeted for subject detection processing. The subject detection unit 404 performs face detection processing and human body detection processing, which detect a region containing a face (a part of a specific object) and a region containing a human body (the specific object), respectively, on the image acquired by the input image acquisition unit 403. The subject detection unit 404 according to the present exemplary embodiment performs two types of detection processing, the face detection and the human body detection, but the subject detection is not limited thereto. The client apparatus 103 can also employ, for example, a unit for detecting an upper body or detecting a partial feature of a face such as an eye, a nose, and a mouth. The image information calculation unit 405 calculates average luminance values of a subject (face or human body) region and a region containing a background around the subject and clothing of the subject based on a detection result acquired from the subject detection unit 404. The parameter determination unit 406 determines a target value of an exposure relating to each detection unit based on the average luminance values of the subject region and the region containing the background around the subject and the clothing of the subject that are acquired from the image information calculation unit 405. The exposure determination unit 407 determines an exposure level (an exposure amount) based on the target value of the exposure acquired from the parameter determination unit 406, and transmits the above-described exposure level (exposure amount) to the imaging apparatus 101 via the communication control unit 402. Then, the exposure is corrected via the control unit 207. A detailed processing flow relating to the subject detection unit 404, the image information calculation unit 405, the parameter determination unit 406, and the exposure determination unit 407 will be described below with reference to a flowchart illustrated in FIG. 5. The display control unit 408 outputs the captured image, in which the exposure correction determined by the exposure determination unit 407 has been reflected, to the display apparatus 105 according to an instruction from the CPU 301.

Figure 5:
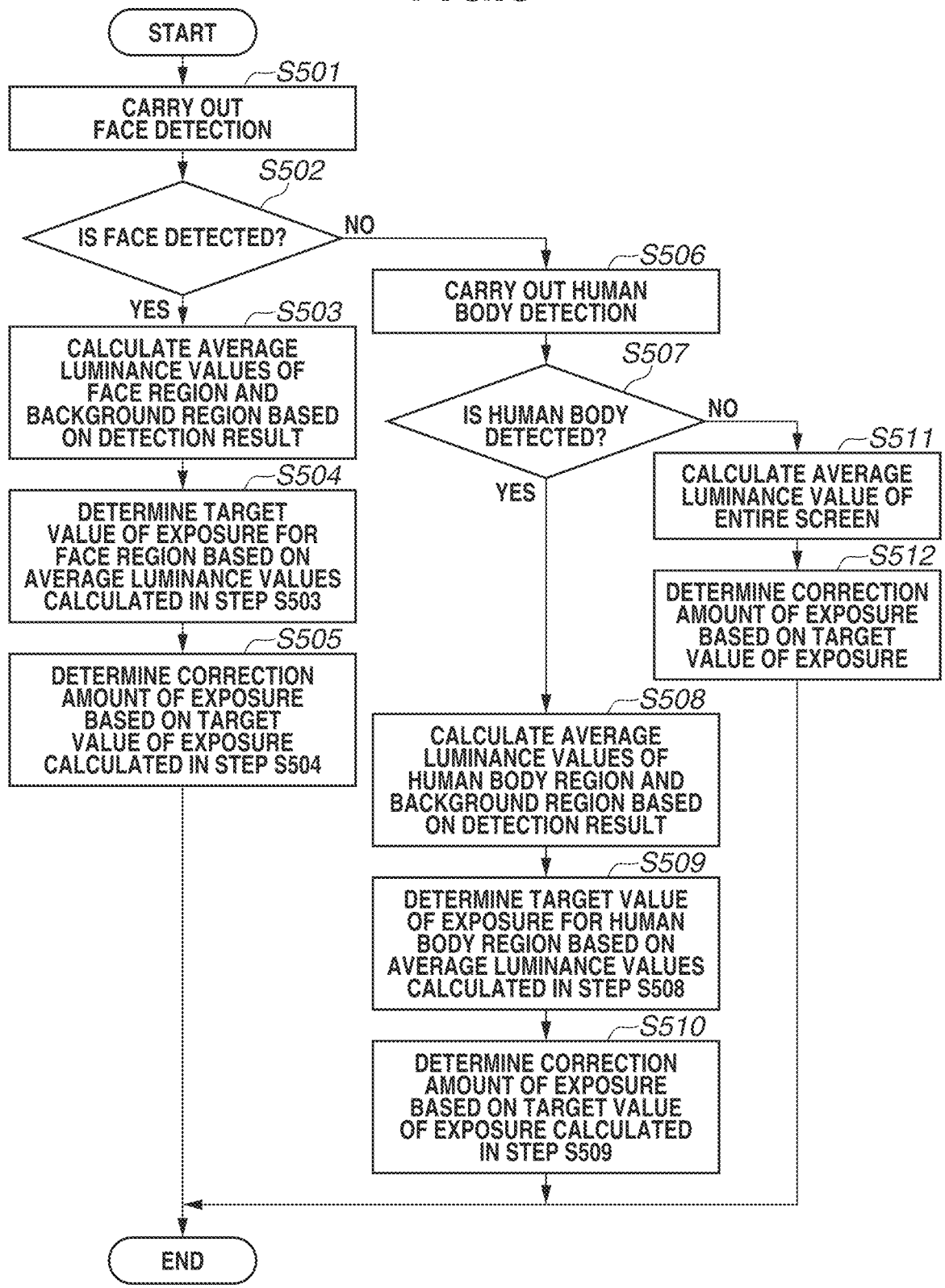
FIG. 5 is a flowchart of processing performed by the client apparatus proposed in the first exemplary embodiment.

In the following description, the subject detection processing, parameter determination processing, and exposure determination processing according to the present exemplary embodiment will be described with reference to the flowchart illustrated in FIG. 5. FIG. 5 is a flowchart exemplarily illustrating the detection processing and the exposure determination processing according to the first exemplary embodiment of the present disclosure. The flowchart illustrated in FIG. 5 will be described, assuming that the imaging system illustrated in FIG. 1 is in a state that each of the apparatuses is powered on and a connection (communication) is established between the imaging apparatus 101 and the client apparatus 103. And, assume that, in this state, the present imaging system repeatedly images a subject, transmits image data, and displays an image on the display apparatus 105 per predetermined update cycle. Then, assume that the flowchart illustrated in FIG. 5 starts based on an input of the image acquired by imaging the subject from the imaging apparatus 101 to the CPU 301 of the client apparatus 103 via the network 102.

First, in step S501, the subject detection unit 404 performs the face detection processing on an input image. As a detection method for the face detection, the subject detection unit 404 can use a pattern (a classifier) generated using statistical learning as a pattern matching method or can be configured to detect the subject using a luminance gradient in a local region as a method other than the pattern matching. In other words, the face detection processing is not limited in terms of the detection method, and the subject detection unit 404 can employ various kinds of methods, such as detection based on machine learning and detection based on distance information.

In step S502, the subject detection unit 404 determines whether a face region is detected in the image in the face detection processing performed in step S501. In a case where no face region is detected (NO in step S502), the processing proceeds to step S506. In a case where at least one or more face region(s) is(are) detected (YES in step S502), the processing proceeds to step S503.

In step S503, the image information calculation unit 405 calculates an average luminance value of the face region and an average luminance value of a background region around the face region based on the result of the face detection acquired by the subject detection unit 404. More specifically, the image information calculation unit 405 applies information about the number of detected targets indicating detected faces, a detected position, and a detected size to the following equation (1), thereby calculating an average luminance value $I_{face}$ of the face region.

$$\bar{I}_{Face} = \frac{1}{f}\sum_{s=1}^{f}\left\{\frac{1}{k_s \times l_s}\sum_{i=-k_s/2}^{k_s/2}\sum_{j=-j_s/2}^{l_s/2} I(v_s+i, h_s+j)\right\} \quad (1)$$

In this equation, I(x, y) represents a luminance value at a two-dimensional coordinate position (x, y) in a horizontal direction (x-axis direction) and a vertical direction (y-axis direction) in the image. Further, f represents the number of detected targets about detected faces, (v, h) represents central coordinates of the detected face, and k and l represent the detected sizes of the subject in the horizontal direction and the vertical direction, respectively. An average luminance value $I_{back}$ of the background region can be calculated by employing processing similar to the equation (1) with respect to a further wide region centered at the central coordinates of the face detection while excluding the region corresponding to the face, as indicated by a region surrounded by a dotted line in FIG. 6A. The average luminance of the background region is calculated based on the central coordinates of the face detection in the present exemplary embodiment, but is not limited thereto. The average luminance of the background region can be calculated by, for example, a method that identifies the background region in the image using a histogram of the entire image or feature extraction processing based on machine learning to calculate the average luminance of this region.

Figure 6A:
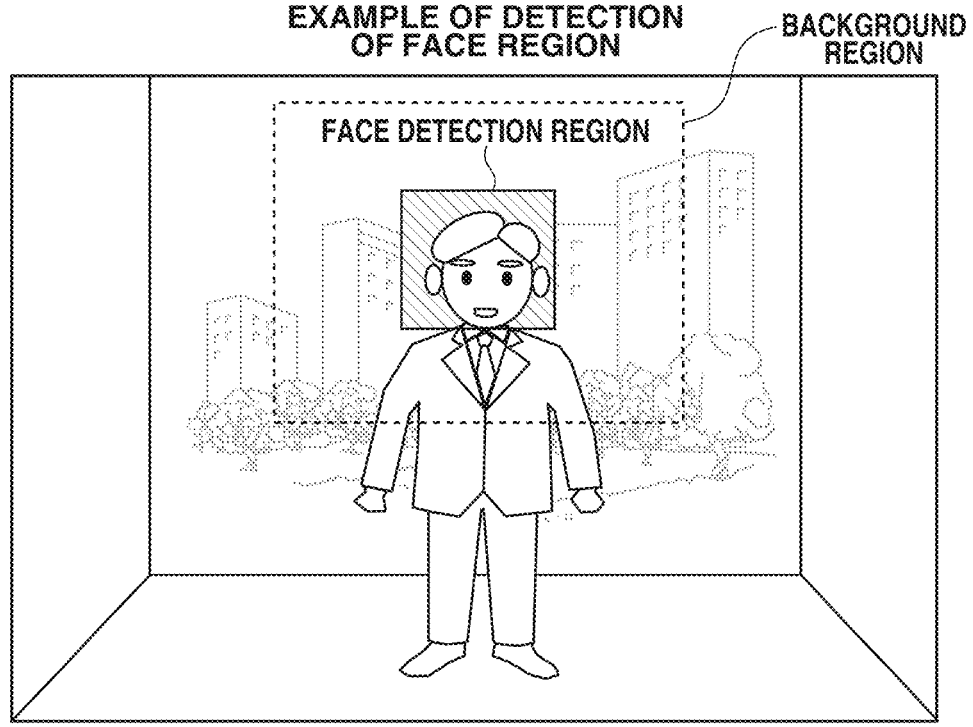
FIGS. 6A and 6B illustrate a relationship between a subject detection region and a background region.
Figure 6B:
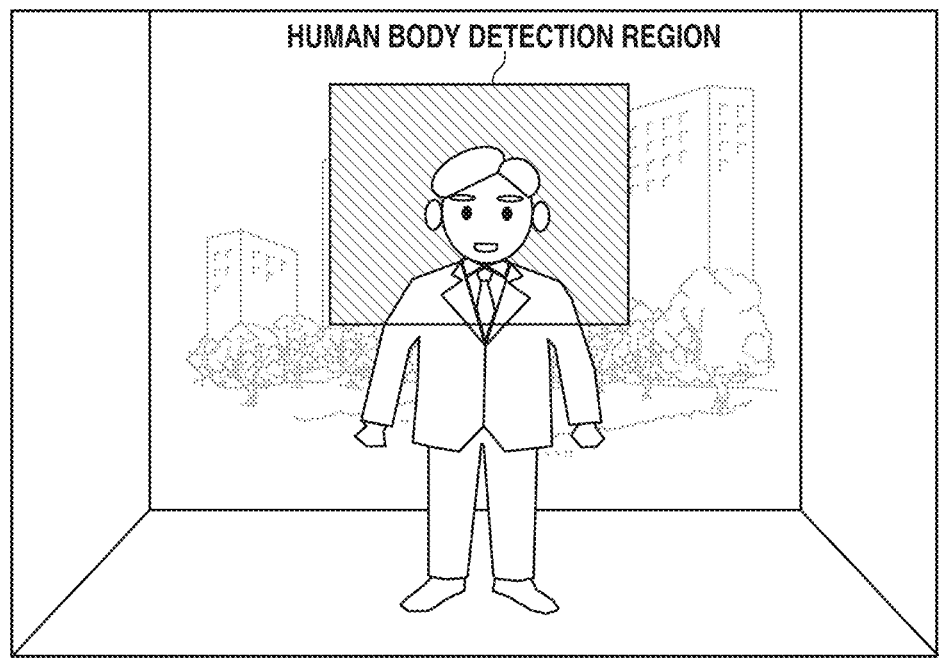

Subsequently, in step S504, the parameter determination unit 406 determines a target value of the exposure for the face region based on the average luminance value acquired from the image information calculation unit 405. For example, in a case where the luminance value of the background region is high compared to the average luminance value of the face region, it is highly likely that the image is captured in a backlit scene that might occur at an entrance/exit of a building or a stadium as illustrated in FIGS. 6A and 6B. In a case where the image is captured in the backlit scene like the example illustrated in FIGS. 6A and 6B, pixels having high luminance values that should be determined to be the background actually (a hatched portion in FIG. 6B) are erroneously contained in the face detection region determined and detected as the face by the subject detection unit 404. This raises such a possibility that the average luminance value of the face region calculated by the image information calculation unit 405 is calculated to be a higher value than expected due to the influence of the pixels in the erroneously contained background region. In consideration of this possibility, the parameter determination unit 406 according to the present exemplary embodiment applies information about the average luminance values of the face detection region and the background region to the following equations (2), (3), and (4) to eliminate the above-described influence of the luminance of the background contained in the face detection region. By this calculation, the parameter determination unit 406 determines a target luminance value $I'_{Face\ Target}$.

$$I'_{Face\ Target} = I_{Face\ Target} + \alpha_{Face} \quad (2)$$

$$\alpha_{Face} = \quad (3)$$

$$\begin{cases} \alpha_{Face\ Max} \\ \text{if } \Delta Diff_{Ave} > TH_{Face\ Max} \\ \alpha_{Face\ Max} \times (\Delta Diff_{Ave} - TH_{Face\ Max})/(TH_{Face\ Max} - TH_{Face\ Min}) \\ \text{if } TH_{Face\ Min} \leq \Delta Diff_{Ave} \leq TH_{Face\ Max} \\ 0 \\ \text{if } -TH_{Face\ Min} < \Delta Diff_{Ave} < TH_{Face\ Min} \\ -\alpha_{Face\ Min} \times (\Delta Diff_{Ave} - TH_{Face\ Min})/(TH_{Face\ Max} - TH_{Face\ Min}) \\ \text{if } -TH_{Face\ Max} \leq \Delta Diff_{Ave} \leq -TH_{Face\ Max} \\ -\alpha_{Face\ Min} \\ \text{if } \Delta Diff_{Ave} < -TH_{Face\ Max} \end{cases}$$

$$\Delta Diff_{Ave} = \bar{I}_{Back} - \bar{I}_{Face} \quad (4)$$

In these equations, $I_{Face\ Target}$ represents a target luminance value of a face region serving as a reference, and can be a value preset by the user or can be an inherent value preset to the hardware. A parameter $\alpha_{Face}$ is a coefficient that affects the degree of correction according to the difference between the average luminance values of the face region and the background region with the center thereof placed at the target luminance value of the face region serving as the reference. Further, the equation (3) is an equation for calculating the parameter α, and the equation (4) indicates the difference between the average luminance of the background region and the face region. The parameters $TH_{Face\ Max}$ and $TH_{Face\ Min}$ contained in the equation (3) adjust how large difference can be allowed between the average luminance value of the face region and the average luminance value of the background region. Further, $\alpha_{Face\ Max}$ and $\alpha_{Face\ Min}$ are parameters for adjusting how large correction is made to the target luminance value of the face region serving as the reference. FIG. 7 is a graph indicating the relationship among the parameters contained in the equation (3). As illustrated in FIG. 7, in a region where the luminance difference between the face region and the background region is small (falls within the threshold value $TH_{Face}$), the (correction) parameter α is set to zero (no correction is made), estimating that the influence of the erroneously contained background region is slight, when the average luminance value of the face region is calculated. On the other hand, in a region where the luminance difference is large, the parameter (correction amount) a is set to a large value and is added to the target value $I_{Face\ Target}$ serving as the reference in consideration of the influence of the background region affecting the average luminance value of the face region. Performing the above-described processing allows an appropriate target value to be set to the face region even in such a scene that the face is underexposed under a backlit environment or such a scene that the face is overexposed although the surroundings thereof are dark.

In step S505, the exposure determination unit 407 calculates the difference value between the average luminance value rce of the face region acquired from the image information calculation unit 405 and the target luminance value $I'_{Face\ Target}$ of the face region acquired from the parameter determination unit 406 as expressed by an equation (5).

$$\Delta Diff = I'_{Face\ target} - \bar{I}_{Face} \quad (5)$$

Subsequently, the exposure determination unit 407 determines an exposure correction amount $EV_{correction}$ based on the calculated difference value ΔDiff, a predetermined threshold value Th, and an exposure value $EV_{current}$ regarding the current exposure. For example, the correction amount $EV_{current}$ is determined as expressed by an equation (6). The exposure value $EV_{current}$ is an EV value converted according to the Additive System of Photographic Exposure (APEX) based on the subject luminance value (a brightness value (BV)), and is set based on a program chart regarding exposure control that is stored in the client apparatus 103 in advance.

$$EV_{correction} = \begin{cases} EV_{current} - \beta & \text{if } \Delta Diff < -Th \\ EV_{current} & \text{if } -Th \leq \Delta Diff \leq Th \\ EV_{current} + \beta & \text{if } Th < \Delta Diff \end{cases} \quad (6)$$

In this equation, a parameter β is a coefficient that affects a degree of correction (a speed) when the exposure is corrected to an underexposure side or an overexposure side with the center thereof placed at the current exposure value $EV_{current}$. Setting the parameter β to a large value contributes to an increase in the speed of (or a reduction in the time taken for) the processing until the exposure reaches the target value, but leads to a sharp change in the brightness of the entire screen in a case where an erroneous determination is contained in the detection result or in a case where the detection of the subject is not stabilized. On the other hand, setting the parameter β to a small value causes a reduction in the speed of (or an increase in the time taken for) the processing until the exposure reaches the target but makes the processing robust against false detection or toward imaging conditions. This parameter β is set as an exposure correction value to be applied to the current exposure value $EV_{current}$ in a case where the difference ΔDiff calculated in step S505 is equal to or larger than the set threshold value Th. This is the processing when at least one or more face region(s) is(are) detected according to the present exemplary embodiment.

Processing in a case where no face region is detected according to the present exemplary embodiment will be described. In a case where no face region is detected in the processing in step S502 (NO in step S502), in step S506, the subject detection unit 404 performs the human body detection processing on the input image.

In step S507, the subject detection unit 404 determines whether the human body region is detected in the image based on the result of the human body detection carried out in step S506. In a case where at least one or more human body region(s) is(are) detected (YES in step S507), the processing proceeds to step S508. In a case where no human body region is detected (NO in step S507), the processing proceeds to step S511. In a case where the flow proceeds to the processing in step S511 (i.e., neither face region nor human body region is detected), the exposure is not corrected based on the result of the subject detection as indicated in steps S511 and S512.

The processing in steps S508 to S510 is performed based on substantially similar calculation equations to the above-described steps, steps S503 to S505 except that the exposure is determined by calculating the average luminance value of the human body region, and therefore the detailed description thereof will be omitted here. When the target value of the exposure for the human body region is determined in step S509, a ratio of the background region contained in the human body region is high compared to a ratio of the background region contained in the face detection region as illustrated in FIGS. 6A and 6B. Accordingly, a large value should also be set as the correction amount to be applied to the target value serving as the reference. Therefore, desirably, a large value is set as a parameter $\alpha_{body}$ corresponding to the human body detection that is to be applied to the equation (2) in step S509 compared to the parameter $\alpha_{face}$ corresponding to the face detection.

The parameters included in the equations (2) and (3) used when the target value of the exposure corresponding to each detection unit is determined, which have been described in the present exemplary embodiment, can be preset values. Alternatively, a value manually selected by the user via the input apparatus 104 can be set.

In the above-described manner, the imaging system according to the present exemplary embodiment allows the target value of the exposure to be determined based on the average luminance values of the subject region and the background region in consideration of the ratio of the false detection region emerging according to the unit of the subject detection. Therefore, the imaging system according to the present exemplary embodiment allows the correction amount of the exposure to be determined according to the detection accuracy with respect to each of a plurality of detection units and the imaging environment, thereby allowing the brightness in conformity with the user's intention to be set to the face and the human body of the subject.

A second exemplary embodiment will be described as a configuration in which parameters of a first detection unit and a second detection unit regarding the exposure and the detection are set based on imaging information associated with an input image, and the exposure is determined based on a result of the subject detection using these parameters. The imaging apparatus 101, the network 102, the client apparatus 103, the input apparatus 104, and the display apparatus 105 forming an imaging system according to the present exemplary embodiment are configured similarly to the above-described first exemplary embodiment, and therefore the descriptions thereof will be omitted here.

FIG. 8 illustrates an example of a functional configuration of the client apparatus 103 according to the present exemplary embodiment. The client apparatus 103 includes an input information acquisition unit 801, a communication control unit 802, an input image acquisition unit 803, a subject detection unit 804, an imaging information acquisition unit 805, a parameter determination unit 806, an exposure determination unit 807, and a display control unit 808.

Figure 9:
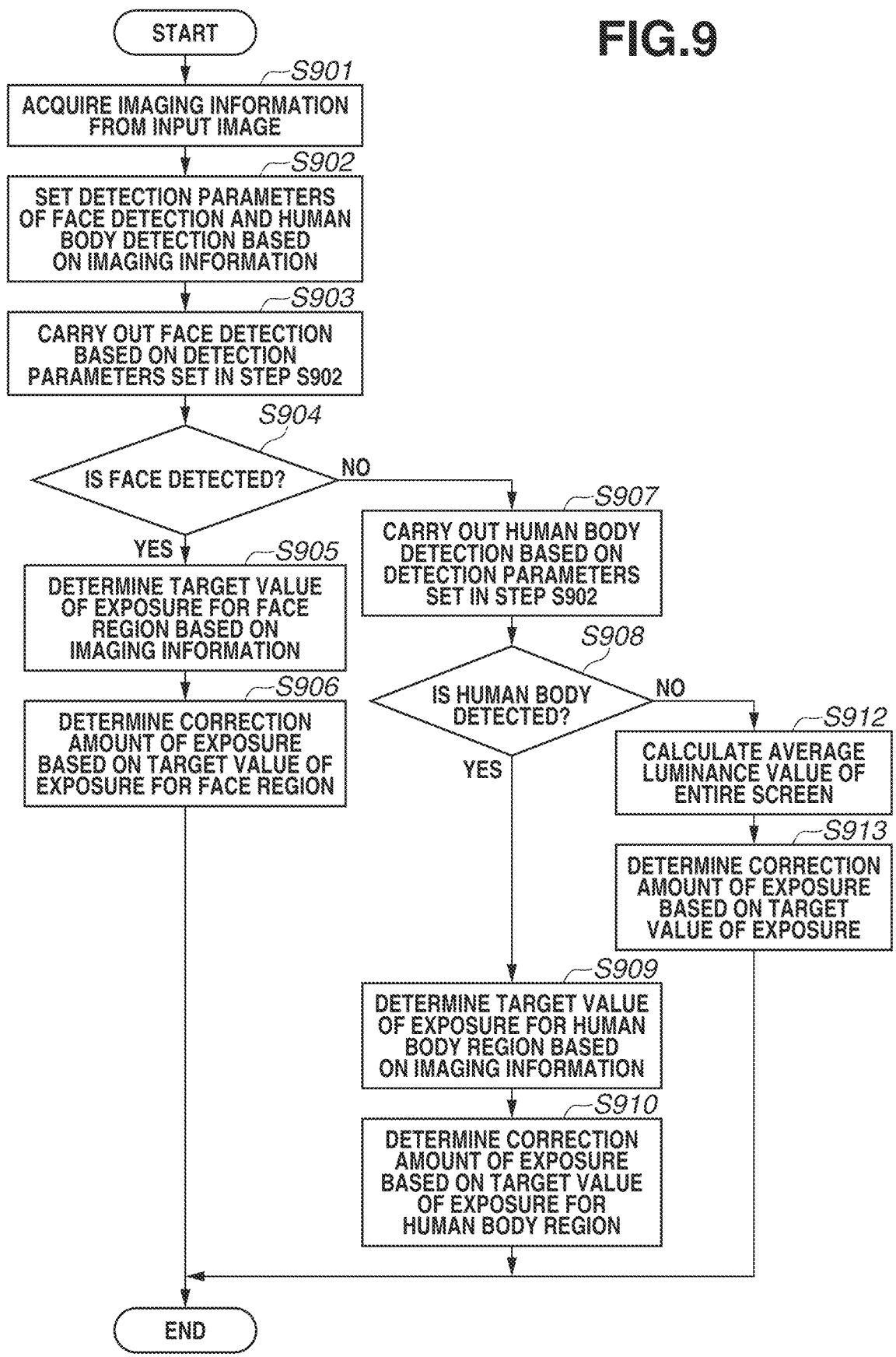
FIG. 9 is a flowchart of processing performed by the client apparatus proposed in the second exemplary embodiment.

In the following description, the parameter determination processing, the subject detection processing, and the exposure determination processing according to the present exemplary embodiment will be described with reference to a flowchart illustrated in FIG. 9. The timing of starting the processing is similar to the first exemplary embodiment, and therefore the description thereof will be omitted here.

In step S901, the imaging information acquisition unit 805 acquires imaging information associated with an input image. For example, setting values of the exposure on the imaging apparatus 101 are acquired as the imaging information. The present exemplary embodiment will be described based on the configuration in which three values, i.e., the shutter speed, the aperture, and the gain can be acquired as the imaging information on the imaging apparatus 101, but the imaging information is not limited thereto.

Further, the detection parameters regarding the detection by the face detection unit and the human body detection unit according to the present exemplary embodiment refer to maximum and minimum detected sizes, the maximum number of detected targets, and the like for the face detection and the human body detection as illustrated in FIG. 10A. Now, FIG. 10A illustrates a default parameter value serving as a reference with respect to each of the detection parameters. The setting value of the parameter serving as the reference can be a preset value or a value manually selected by the user via the input apparatus 104 can be set.

Referring back to FIG. 9, in step S902, the parameter determination unit 806 determines the detection parameters regarding the detection by the face detection unit and the human body detection unit based on the setting values of the exposure acquired by the imaging information acquisition unit 805. For example, in a case where the shutter speed is low, it is highly likely that the detailed structure such as the eyes, the nose, and the mouth is imaged as if flowing with respect to the face of a moving subject contained in the screen as illustrated in FIG. 10B, which makes the detection of s face difficult. Therefore, in a case where the shutter speed is low, the parameter determination unit 806 according to the present exemplary embodiment determines the parameters so as to further prioritize the human body detection processing over the face detection. More specifically, regarding the face detection, compared to the default settings, the parameter determination unit 806 sets the maximum detected size to a smaller value (reduces it from 50 to 10), the value of the minimum detected size to a larger value (increases it from 4 to 8), and the maximum number of detected targets to a smaller value (reduces it from 50 to 5). On the other hand, regarding the human body detection, compared to the default settings, the parameter determination unit 806 sets the value of the maximum detected size to a larger value (increases it from 50 to 80), the value of the minimum detected size to a smaller value (reduces it from 4 to 2), and the maximum number of detected targets to a larger value (increases it from 50 to 80). Similarly, regarding the other setting values of the exposure, for example, in a case where the value of the aperture is large, this leads to an increase in the depth of field and an increase in the range where the structure of the face is brought into focus. Accordingly, in such a case, the parameter values are set to place greater emphasis on the face detection processing compared to the default values. Further, in a case where the value of the gain is large, this leads to an increase in random noise occurring in the screen, thereby making the detailed structure of the subject obscure by being buried in the noise. Accordingly, in such a case, the parameter values are set to place slighter emphasis on the face detection processing and place greater emphasis on the human body detection processing compared to the default values.

Subsequently, in step S903, the subject detection unit 804 performs the face detection processing based on the detection parameters of the face detection determined by the parameter determination unit 806.

In step S904, the subject detection unit 804 determines whether the face is detected in the image based on the result of the face detection carried out in step S903. In a case where at least one or more face region(s) is(are) detected (YES in step S904), the processing proceeds to step S905. In a case where no face region is detected (NO in step S904), the processing proceeds to step S907.

The processing regarding steps S905 and S906 is performed based on substantially similar calculation equations to the processing in steps S503 and S505 according to the above-described first exemplary embodiment except for the calculation of the average luminance value of the background region, so that the detailed description thereof will be omitted here. This is the processing in a case where at least one or more face region(s) is(are) detected according to the present exemplary embodiment.

In step S907, the subject detection unit 804 performs the human body detection processing based on the detection parameters of the human body detection unit determined by the parameter determination unit 806.

Subsequently, in step S908, the subject detection unit 804 determines whether the human body region is detected in the image based on the result of the human body detection carried out in step S907. In a case where at least one or more human body region(s) is(are) detected (YES in step S908), the processing proceeds to step S909. In a case where no human body region is detected (NO in step S908), the processing proceeds to step S912. In a case where the flow proceeds to the processing in step S912 (i.e., neither face region nor human body region is detected), the exposure is not corrected based on the result of the subject detection. The processing in steps S909 and S910 is performed based on substantially similar calculation equations to the above-described steps, steps S508 and S510 except for the calculation of the average luminance value of the background region, so that the detailed description thereof will be omitted here.

In the above-described manner, the imaging system according to the present exemplary embodiment can set the parameters regarding the detection by the first detection unit and the second detection unit based on the imaging information acquired from the imaging information acquisition unit 805. As a result, the imaging system can carry out the detection of the subject with further higher accuracy.

The present exemplary embodiment has been described as the configuration in which the maximum and minimum detected sizes and the maximum number of detected targets with respect to the face detection and the human body detection are used as the parameters regarding the detection by the first detection unit and the second detection unit. However, embodiments of the present disclosure are not limited thereto. For example, an exemplary embodiment of the present disclosure can be configured to use a detection speed, a detection accuracy, and a frequency of execution of the detection processing.

Further, the present exemplary embodiment has been described as the configuration in which the parameter determination unit 806 sets the detection parameters for each detection unit based on the setting values of the exposure at the time of imaging as the predetermined imaging information. However, embodiments of the present disclosure are not limited thereto. For example, an exemplary embodiment of the present disclosure can be configured to set the detection parameters based on imaging information such as information about automatic focus (AF) processing regarding a focus adjustment, information about white balance, and distance information of the subject, and the number of control cameras.

Furthermore, the above-described exemplary embodiments have been described as the configuration in which the above-described parameters regarding the detection of the subject and the exposure are automatically set according to the client apparatus 103 acquiring the image input from the imaging apparatus 101, but embodiments of the present disclosure are not limited thereto. For example, an exemplary embodiment of the present disclosure can be configured to set the parameters according to a manual operation input by the user. As to the detection processing of the subject, an exemplary embodiment of the present disclosure can be configured to perform the subject detection processing at a cycle longer than an update cycle of the exposure in the exposure control, or can be configured to perform the subject detection processing according to a manual operation or a start of the imaging (recording) by the user, or a change in an angle of view due to a zoom operation, panning, tilting, or the like.

The above-described exemplary embodiments have been described assuming that the imaging system is configured in such a manner that the client apparatus 103 is an information processing apparatus such as a personal computer (PC) and the imaging apparatus 101 and the client apparatus 103 are connected in a wired or wireless manner, but embodiments of the present disclosure are not limited thereto. For example, an exemplary embodiment of the present disclosure can be configured in such a manner that an imaging apparatus itself such as the imaging apparatus 101 functions as an information processing apparatus equivalent to the client apparatus 103, and this imaging apparatus is equipped with the input apparatus 104 and the display apparatus 105. Alternatively, an exemplary embodiment of the present disclosure can be configured in such a manner that an imaging apparatus such as the imaging apparatus 101 performs a part of the above-described operation performed by the client apparatus 103.

Further, the above-described exemplary embodiments have been described based on a lens-integrated imaging apparatus, in which the imaging optical system 201 is integrally formed on the imaging apparatus 101 as an example of the imaging apparatus for embodying the present disclosure, but embodiments of the present disclosure are not limited thereto. For example, a lens-interchangeable imaging apparatus, in which the imaging apparatus 101 and a lens unit including the imaging optical system 201 are prepared individually, can be used as the imaging apparatus for embodying the present disclosure.

The above-described exemplary embodiments have been described assuming that the imaging apparatus for embodying the present disclosure is the imaging apparatus as an example thereof, but embodiments of the present disclosure are not limited thereto. For example, an exemplary embodiment of the present disclosure can be configured to employ an imaging apparatus other than the imaging apparatus, such as a portable device and a wearable terminal such as a digital camera, a digital video camera, and a smart-phone. Further, the client apparatus 103, which is the information processing apparatus for embodying the present disclosure, is assumed to be an electronic apparatus such as a PC as an example thereof in the above-described exemplary embodiments, but embodiments of the present disclosure are not limited thereto. For example, an exemplary embodiment of the present disclosure can be configured to employ another electronic apparatus, such as a smart-phone or a tablet terminal, as the client apparatus 103.

Further, the above-described exemplary embodiments are configured in such a manner that the CPU 301 of the client apparatus 103 fulfills each of the functions like the examples illustrated in FIG. 4, but an exemplary embodiment of the present disclosure can be configured to include each of these functions as a unit different from the CPU 301.

Having described the exemplary embodiments of the present disclosure, the present disclosure is not limited to these exemplary embodiments and can be modified and changed in various manners within the range of the spirit thereof.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-033883, filed Feb. 28, 2020, which is hereby incorporated by reference herein in its entirety.

What is claimed is:

1. An information processing apparatus comprising:
an imaging apparatus configured to acquire an image;
at least one memory storing instructions; and
at least one processor executing the instructions causing the information processing apparatus to:
detect a specific object from the image;
detect a part of the specific object from the image;
determine a first exposure amount with respect to the detected specific object, and determine a second exposure amount with respect to the part of the detected specific object;
determine if a difference between the first exposure amount and the second exposure amount exceed a predetermined threshold value; and
determine a parameter value to adjust the second exposure amount to reduce the difference between the first exposure amount and the second exposure amount when the predetermined threshold value is exceeded.

2. The information processing apparatus according to claim 1, wherein the parameter value is the first exposure amount or the second exposure amount.

3. The information processing apparatus according to claim 1, wherein the parameter value is a maximum detected size.

4. The information processing apparatus according to claim 1, wherein the parameter value is a minimum detected size.

5. The information processing apparatus according to claim 1, wherein the parameter value is a detection speed.

6. The information processing apparatus according to claim 1, wherein the parameter value is frequency of execution of a detection processing.

7. The information processing apparatus according to claim 1, further comprising receiving a setting of the parameter value by a user,
wherein the parameter is determined based on the setting of the received parameter.

8. The information processing apparatus according to claim 1, wherein a human body is detected in the image.

9. The information processing apparatus according to claim 1, wherein a face is detected in the image.

10. An imaging apparatus comprising the information processing apparatus according to claim 1.

11. A method comprising:
acquiring an image;
detecting a specific object from the image;
detecting a part of the specific object from the image;
determining a first exposure amount with respect to the specific object detected by the detecting the specific object, and determining a second exposure amount with respect to the part of the specific object detected by the detecting the part of the specific object;
determining if a difference between the first exposure amount and the second exposure amount exceed a predetermined threshold value; and
determining a parameter value to adjust the second exposure amount to reduce the difference between the first exposure amount and the second exposure amount when the predetermined threshold value is exceeded.

12. The method according to claim 11, wherein the parameter value is a maximum detected size of the specific object or the part of the specific object.

13. The method according to claim 11, wherein the parameter value is a minimum detected size of the specific object or the part of the specific object.

14. A non-transitory computer-readable storage medium storing a program for causing a computer to execute a method comprising:
acquiring an image;
detecting a specific object from the image;
detecting a part of the specific object from the image;
determining a first exposure amount with respect to the specific object detected by the detecting the specific object, and determining a second exposure amount with respect to the part of the specific object detected by the detecting the part of the specific object;
determining if a difference between the first exposure amount and the second exposure amount exceed a predetermined threshold value; and
determining a parameter value to adjust the second exposure amount to reduce the difference between the first exposure amount and the second exposure amount when the predetermined threshold value is exceeded.

15. The non-transitory computer-readable storage medium according to claim 14, wherein the parameter value is a maximum detected size of the specific object or the part of the specific object.

16. The non-transitory computer-readable storage medium according to claim 14, wherein the parameter value is a minimum detected size of the specific object or the part of the specific object.

* * * * *